(12) United States Patent
Lee et al.

(10) Patent No.: US 9,721,177 B2
(45) Date of Patent: *Aug. 1, 2017

(54) IMAGE ACQUISITION USING A LEVEL-INDICATION ICON

(71) Applicant: INTUIT INC., Mountain View, CA (US)

(72) Inventors: Sammy Lee, San Jose, CA (US); Grace Pariante, Palo Alto, CA (US); Eugene Krivopaltsev, San Jose, CA (US); Sreeneel K. Maddika, San Ramon, CA (US); Bobby G. Bray, Jr., San Diego, CA (US); Andrew B. Firstenberger, Cardiff by the Sea, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,658

(22) Filed: Jan. 25, 2016

(65) Prior Publication Data

US 2016/0140410 A1 May 19, 2016

Related U.S. Application Data

(63) Continuation of application No. 14/252,675, filed on Apr. 14, 2014, now Pat. No. 9,245,341.

(51) Int. Cl.
*H04N 5/232* (2006.01)
*G06K 9/32* (2006.01)
(Continued)

(52) U.S. Cl.
CPC ....... *G06K 9/3208* (2013.01); *G06K 9/00463* (2013.01); *G06K 9/209* (2013.01);
(Continued)

(58) Field of Classification Search
CPC .. G06K 9/3208; G06K 9/00463; G06K 9/209; G06K 9/2081; G06K 9/3283;
(Continued)

(56) References Cited

U.S. PATENT DOCUMENTS 9,245,341 B2 * 1/2016 Lee ................... H04N 5/23293
2010/0088099 A1 4/2010 Kurzweil et al.
(Continued)

FOREIGN PATENT DOCUMENTS

WO 2007115111 A2 10/2007

*Primary Examiner* — Gevell Selby
(74) *Attorney, Agent, or Firm* — Patterson + Sheridan, LLP

(57) ABSTRACT

During an information-extraction technique, visual suitability indicators may be displayed to a user of the electronic device to assist the user in acquiring an image of a document that is suitable for subsequent extraction of textual information. For example, an imaging application executed by the electronic device may display, in a window associated with the imaging application, a visual suitability indicator of a tilt orientation of the electronic device relative to a plane of the document. When the tilt orientation falls within a predefined range, the electronic device may modify the visual suitability indicators to provide visual feedback to the user. Then, the electronic device may acquire the image of the document using an imaging device, which is integrated into the electronic device. Next, the electronic device may extract the textual information from the image of the document using optical character recognition.

17 Claims, 4 Drawing Sheets

(51) Int. Cl.
  *G06K 9/00* (2006.01)
  *G06K 9/20* (2006.01)
  *G06K 9/34* (2006.01)
  *G06T 7/70* (2017.01)

(52) U.S. Cl.
  CPC ......... *G06K 9/2081* (2013.01); *G06K 9/3283* (2013.01); *G06K 9/344* (2013.01); *G06T 7/70* (2017.01); *H04N 5/23222* (2013.01); *H04N 5/23293* (2013.01); *G06K 2209/01* (2013.01); *G06T 2207/30176* (2013.01); *H04N 5/23258* (2013.01)

(58) Field of Classification Search
  CPC ...... G06K 9/344; G06K 9/00; H04N 5/23222; H04N 5/23293; H04N 5/23258; G06T 7/004; G06T 2207/30176
  See application file for complete search history.

(56) References Cited

U.S. PATENT DOCUMENTS

| | | |
|---|---|---|
| 2012/0007993 A1 | 1/2012 | Wang et al. |
| 2012/0218444 A1 | 8/2012 | Stach |
| 2013/0044194 A1 | 2/2013 | Tilt et al. |
| 2013/0058575 A1 | 3/2013 | Koo et al. |
| 2013/0182002 A1 | 7/2013 | Macciola et al. |
| 2014/0067631 A1* | 3/2014 | Dhuse .................. G06Q 40/10 705/30 |
| 2014/0072201 A1 | 3/2014 | Tilt |

\* cited by examiner

IMAGE ACQUISITION USING A LEVEL-INDICATION ICON

RELATED APPLICATION

The present patent is a continuation of, and hereby claims priority under 35 U.S.C §120 to, pending U.S. patent application Ser. No. 14/252,675, entitled "Image Acquisition Using a Level-Indication Icon," by inventors Sammy Lee, Grace Pariante, Eugene Krivopaltsev, Sreeneel K. Maddika, Bobby G. Bray JR and Andrew B. Firstenberger, filed on 14 Apr. 2014.

BACKGROUND

The present disclosure relates to techniques for acquiring an image and extracting textual information from the acquired image. More specifically, the present disclosure relates to a technique for acquiring an image based on visual suitability indicators and extracting the textual information using optical character recognition.

The widespread availability of digital cameras and cellular telephones with integrated imaging sensors has led to a significant increase in digital photography and associated applications that use information from the acquired images. For example, after a user captures an image of a document (such as a financial document) using a digital camera or a cellular telephone, an application executing on the electronic device (such as a financial application) can extract information from the image using optical character recognition. Then, at least in principle, the financial application can use the extracted information to populate fields in a form or to perform a financial calculation.

However, in practice, the ability to extract useful information from an image (especially for use with an application) is often restricted by the image quality. For example, depending on the image quality, errors may occur when extracting the information using optical character recognition. These errors can make it more difficult, if not impossible, for an application to subsequently use the extracted information.

Consequently, after acquiring an image, the user may need to perform post-acquisition operations, such as: editing the image to crop the area of interest; correcting any errors that occurred in the extracted information; and, if the image is blurry or the area of interest was not captured, repeating the image-capture and/or post-acquisition operations one or more times. Performing the image-capture and/or post-acquisition operations once, let alone multiple times, is time-consuming and may consequently limit the willingness of users to acquire images or to use applications that leverage the information in images.

SUMMARY

The disclosed embodiments relate to an electronic device that extracts textual information from an image. During operation, the electronic device launches an imaging application that executes on the electronic device. Next, the electronic device displays, in a window associated with the imaging application, visual suitability indicators of a tilt orientation of the electronic device relative to a plane of a document. The user can then adjust the tilt orientation of the electronic device, and the visual suitability indicators are modified when the tilt orientation falls within a predefined range. Next, the electronic device acquires an image of the document using an imaging device, which is integrated into the electronic device. Finally, the electronic device extracts the textual information from the image of the document using optical character recognition.

In some embodiments, the electronic device receives a user command to extract the information, and the imaging application is launched in response to the user command.

Note that the visual suitability indicators may be non-textual. For example, the visual suitability indicators may include: a circle in the center of the window, a ball whose position in the window indicates the tilt orientation, and/or corner markers proximate to the corners of the window. Moreover, the ball may be displayed within the circle when the tilt orientation is within the predefined range. Furthermore, the visual suitability indicators may indicate: light intensity, an in-plane orientation of the document relative to the electronic device, and/or framing of the document in the window, and the visual suitability indicators are further modified when: the light intensity is sufficient, the in-plane orientation falls within a second predefined range, and/or the document is suitably framed in the window.

Additionally, modifying the visual suitability indicators may include changing color of a visual suitability indicator.

In some embodiments, the image is acquired without the user activating an acquisition icon associated with the imaging device. Alternatively or additionally, the image may be acquired after the tilt orientation falls within the predefined range for more than a time interval.

Moreover, after acquiring the image, the electronic device may: display the image to a user, receive user feedback about the image from a user and, if the user feedback rejects the image, repeat the displaying, modifying and acquiring operations to acquire another image of the document. Alternatively or additionally, after extracting the information, the electronic device receives additional user feedback from the user about the accuracy of the extracted information.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for extracting information, and a computer-program product (e.g., software) for use with the electronic device are described. During this information-extraction technique, visual suitability indicators may be displayed to a user of the electronic device to assist the user in acquiring an image of a document that is suitable for subsequent extraction of the information. For example, an imaging application executed by the electronic device (such as a software application) may display, in a window associated with the imaging application, a visual suitability indicator of a tilt orientation of the electronic device relative to a plane of a document. When the tilt orientation falls within a predefined range, the electronic device may modify the visual suitability indicators to provide visual feedback to the user. Then, the electronic device may acquire the image of the document using an imaging device, which is integrated into the electronic device. Furthermore, the electronic device may extract the information from the image of the document using optical character recognition.

By facilitating acquisition of images that are suitable for subsequent extraction of the information (e.g., using optical character recognition), the information-extraction technique may facilitate accurate extraction of the information. In the process, the information-extraction technique may simplify the use of the imaging sensor, the application and, thus, the electronic device. Consequently, the information-extraction technique may significantly improve the user experience when using the application and the electronic device. In addition, the information-extraction technique may also significantly improve the user experience when using other applications (such as a financial application) that leverage the extracted information. Therefore, the information-extraction technique may increase customer satisfaction and sales of one or more applications and the electronic device In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
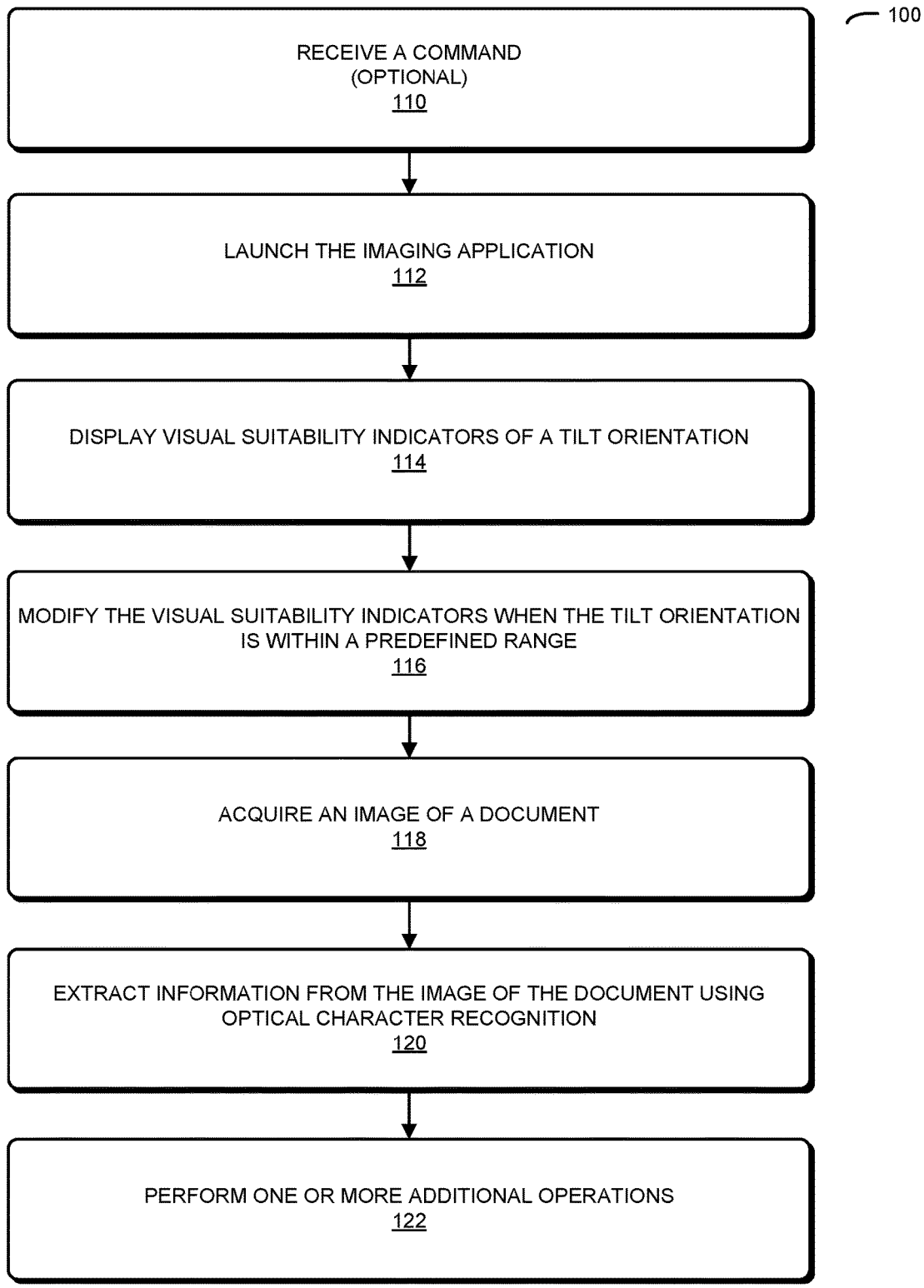
FIG. 1 is a flow chart illustrating a method for extracting information in accordance with an embodiment of the present disclosure.
Figure 4:
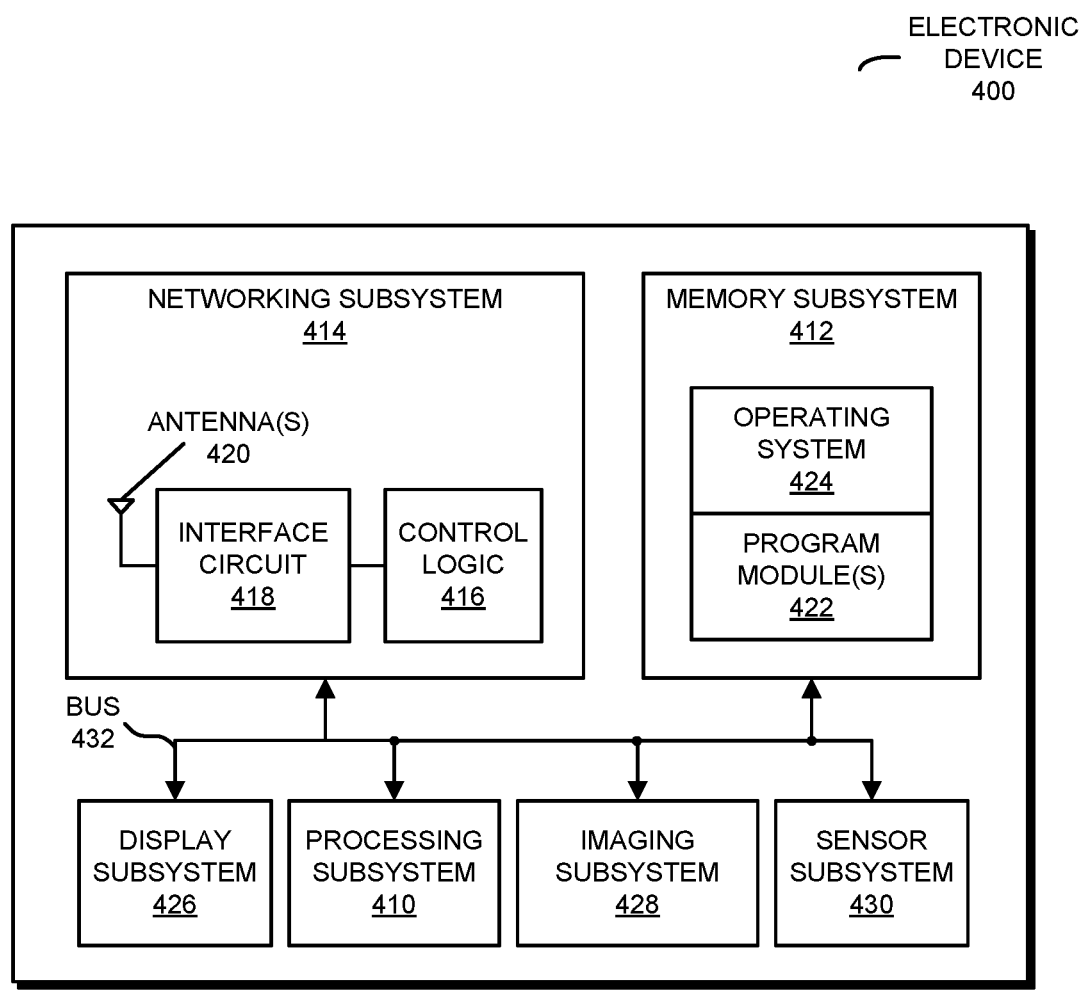
FIG. 4 is a block diagram illustrating an electronic device that performs the method of FIG. 1 in accordance with an embodiment of the present disclosure.

We now describe embodiments of the information-extraction technique, which may be performed by an electronic device (such as electronic device 400 in FIG. 4). FIG. 1 presents a flow chart illustrating a method 100 for extracting information. During operation, the electronic device launches an imaging application (operation 112) that executes on the electronic device. For example, a user of the electronic device may press a physical button or activate an icon in a user interface that launches the imaging application. More generally, the electronic device may launch the imaging application in response to an optional user command (operation 110) that is received from the user, such as a user command to extract the information.

This imaging application may instruct the user to acquire an image of a document using an imaging device (such as a CMOS or CCD sensor), which is integrated into the electronic device. For example, the imaging application may display an instruction on a display of the electronic device. Note that the document may include a financial document (such as: an invoice, a paycheck, a bill, a W-2 form, a financial vehicle, or any document conveying information regarding financial information). Moreover, the image may include one or more fields in the document, which may include: an account number, an amount due, and/or a due date.

After providing the instruction and before the user acquires the image by activating an image-activation mechanism associated with the imaging device (such as a physical button or a virtual acquisition icon for activating the imaging device), or before the imaging application automatically acquires the image (i.e., without user action), the imaging application displays, in a window associated with the imaging application (e.g., on the display), visual suitability indicators of a tilt orientation (operation 114) of the electronic device relative to a plane of the document. Note that the tilt orientation may reflect the angular position of the electronic device, as determined by one or more sensors in the electronic device, e.g., an accelerometer and/or a gyroscope. Therefore, the tilt orientation may be based on an orientation in a coordinate system, such as x, y, and z, and associated angles $\theta$, $\alpha$, and $\gamma$, and/or accelerations along one or more axes.

Note that the visual suitability indicators may be non-textual. As described further below with reference to FIG. 2, the visual suitability indicators may include: a circle in the center of the window, a ball whose position in the window indicates the tilt orientation, and/or corner markers proximate to the corners of the window (which may help the user frame the document in the window). Furthermore, the visual suitability indicators may indicate: light intensity, an in-plane orientation of the document relative to the electronic device, and/or framing of the document in the window.

Moreover, the imaging application modifies the visual suitability indicators when the tilt orientation falls within, or outside, a predefined range (operation 116). As described further below with reference to FIG. 3, the ball may be displayed within the circle when the tilt orientation is within the predefined range (such as 5-10°). Furthermore, the visual suitability indicators may be further modified when: the light intensity is sufficient, the in-plane orientation falls within a second predefined range (such as 5-10°), and/or the document is suitably framed in the window. Additionally, modifying the visual suitability indicators may include changing color of a visual suitability indicator.

Next, the imaging application acquires an image of the document (operation 118) using the imaging device. For example, the image may be acquired when the user performs an action (such as activating the image-activation mechanism associated with the imaging device), or without the user performing an action (such as when the imaging application automatically acquires the image). In particular, the image may be acquired after the tilt orientation falls within the predefined range for more than a time interval (such as 0.5-3 s).

Furthermore, the imaging application extracts the information from the image of the document using optical character recognition (operation 120). However, in some embodiments the information is extracted using intelligent character recognition.

In some embodiments, after acquiring the image (operation 118), the imaging application performs one or more additional actions (operation 122). For example, the imaging application may: display the image to a user on the display, receive user feedback about the image from a user and, if the user feedback rejects the image, repeat the displaying (operation 114), modifying (operation 116) and acquiring (operation 118) to acquire another image of the document. Alternatively or additionally, after extracting the information (operation 120), the electronic device receives additional user feedback from the user about the accuracy of the extracted information.

In some embodiments of method 100, there may be additional or fewer operations. For example, the extraction of the information may be optionally based on historical information previously extracted from other documents. In particular, if similar information has been previously extracted from another instance of the document, then this previously extracted information can be used during the analysis to identify and/or to correct an error(s). Thus, if the document is a paycheck, the employer name, which was extracted from a previous paycheck, may be used to correct an error that occurred during extraction of the employer name from the current paycheck. Alternatively or additionally, automatic capture of one or more images may be based on: proper centering or framing of the document (such as using edge detection of edges of the document within the frame), proper lighting, the focus condition and/or the tilt orientation. Moreover, the order of the operations may be changed, and/or two or more operations may be combined into a single operation.

By providing the visual suitability indicators (which provide an intuitive sense of when the image of the document is likely to be suitable for the subsequent extraction of the information), the information-extraction technique can improve the accuracy of the extracted information, and can reduce the time needed to complete the process. Therefore, the information-extraction technique can significantly improve the user experience when using the imaging application and the electronic device.

In an exemplary embodiment, the information-extraction technique leverages the capabilities of digital cameras and imaging sensors in cellular telephones to acquire suitable images of documents when visible suitability indicators (such as the tilt orientation or angle of the digital camera) are within one or more predefined ranges. These images may be acquired without user action (i.e., before the user activates or presses a physical button, a virtual icon or an image-activation mechanism associated with an imaging device that is normally used to take pictures).

In particular, in response to instructions from the imaging application, such as a verbal prompt or a message displayed on a display or screen, the user may point the imaging device toward a location or an area of interest in a document (such as a field in an invoice or a check, e.g., an account number), and this area may be displayed in the view finder on the screen. The imaging application executing on the electronic device may also display or present other visual suitability indicators (such as a graphical indication of the tilt orientation) on the screen. While the user is pointing the imaging device toward the location on the document and the visible suitability indicators (such as the tilt orientation) are within the one or more predefined ranges, one or more images may be acquired. For example, the imaging application and/or the electronic device may provide a signal to the imaging device, which then takes one or more pictures or images of the area of interest.

In some embodiments, the resulting one or more images are presented to the user, who provides feedback on the image quality. If one or more images are blurry or the desired information at one of the locations is absent (for example, if the information isn't included in the image), one or more of the images may be re-acquired.

Subsequently, information in at least some of the images can be extracted using optical character recognition, and the extracted information may then be used by a financial application such as a remote-check-deposit application, financial management applications, or income-tax application. In some embodiments, the extracted information is presented to the user prior to its use by the imaging application and/or the financial application. If the user indicates the extracted information is incorrect, the one or more images may be reacquired.

In some embodiments, the visible suitability indicators graphically indicate when there is sufficient lighting (or light intensity) or not. Even if ambient light is sufficient to acquire the one or more images, the imaging application may also activate an integrated flash or light to increase the quality of the one or more images. Thus, the flash may be selectively triggered by the imaging application and/or the electronic device based on a focus level that corresponds to a focus of the imaging device and/or the exposure setting. This may make the extraction of information in the one or more images simpler and/or more accurate.

Additionally, to facilitate acquisition of the one or more images, in some embodiments the displayed view finder or the image-capture zone associated with the imaging device (such as corner markers for the frame of the image specified by the imaging application) may be adjusted. For example, the view finder or the image-capture zone may be adjusted based on a size of a field associated with a given location in the document. This field may be predefined so that the desired information associated with the given location is captured in the corresponding images. For example, if the given location is an account number, the field may be a rectangular block or region that includes the account number, and the view finder or the image-capture zone may be adjusted accordingly so that the account number is included in at least some of the images (or so that visual feedback is provided to the user so that they can frame the location properly). However, if the location is an address, the view finder may display a larger square to cover the three or four lines in a typical address field in a document. This adjustment of the view finder may improve the accuracy of the extracted information and, thus, may significantly increase user satisfaction when using the imaging application.

In an exemplary embodiment, a customer (John) uses the imaging application to extract information from a document, such as a bill. When John receives a physical bill, he may activate the imaging application on his cellular telephone. In response to displayed instructions, John may center an account number on the bill in the view finder shown on the screen of the cellular telephone. For example, John may position the cellular telephone so that the account number is centered within corner markers for a frame that is displayed on a screen. (As noted previously, the corner markers in the view finder may be repositioned based on the predefined size of a field at the location in the bill.) Furthermore, a graphical indication of the tilt orientation of the cellular telephone may be displayed so that John can properly level the cellular telephone. Once John has done this, the imaging application may instruct or signal the imaging device to take one or more pictures or to acquire one or more images of the location in the bill. As noted previously, the imaging application may also enable or disable the flash based on the focus level and/or the exposure setting (and, more generally, based on the lighting conditions or intensity).

After the one or more images have been acquired, the imaging application may process the one or more images using optical character recognition (such as by using an optical-character-recognition engine). For example, by combining scanned text (and, more generally, extracted information) from the one or more images (which may leverage the spatial-position information of the location in the bill, relative distances of points of interest in the one or more images from the location, and/or historical data, such as previously extracted information or information in a financial history of the user), the imaging application may determine the correct result (i.e., the account number) with a high certainty. Thus, in some embodiments historical data is used if there was a match previously (i.e., if the correct information was extracted previously or is known). If yes, the previous match may be used to identify and/or correct an error in the extracted information.

After the information is extracted, the imaging application and/or a financial application executing on the cellular telephone may show the resulting text to John. If he feels that this is not the data that was needed, John can re-point the imaging device at the bill, which may result in one or more additional images being acquired. Moreover, John may repeat the aforementioned operations for other locations on the bill (or another document), such as locations corresponding to: the address of the biller, the bill due date, and the amount billed. Once the imaging application has processed the one or more images, the financial application may have all the information needed to pay the bill.

Note that in the preceding example John may or may not have taken a picture of the whole bill. Furthermore, at least some of the processing of the one or more images may be handled on the electronic device, on a remote computer and/or via a client-server architecture. For example, image processing to determine image suitability prior to image acquisition and/or extraction of information from an acquired image using optical character recognition may be performed by a server that communicates with the electronic device via a network.

Figure 2:
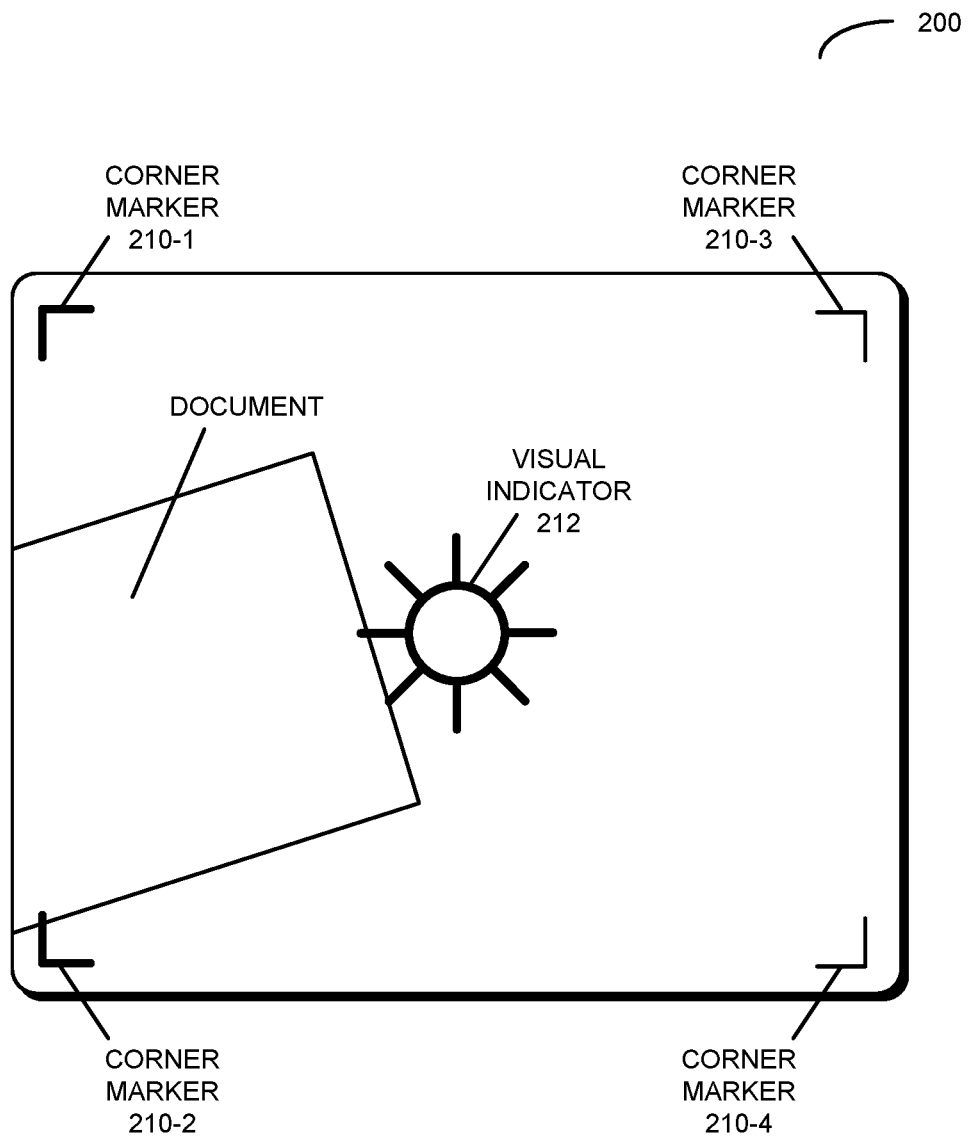
FIG. 2 is a drawing illustrating a user interface in an electronic device that performs the method of FIG. 1 in accordance with an embodiment of the present disclosure.

We now describe embodiments of a user interface that includes the visual suitability indicators. FIG. 2 presents a drawing illustrating a user interface 200 in an electronic device that performs method 100 (FIG. 1). This user interface includes visual indicators that provide graphical feedback to a user so that the user can acquire an image of document that can be subsequently used in optical character recognition. In general, 50% of images may not be suitable for use in optical character recognition because of: misalignment or skew of the image relative to the camera or imaging device; poor lighting and/or not centering the document properly. Consequently, the resulting image may not be suitable for subsequent optical character recognition. This may cause the user to skip what could have been a time-saving approach. Instead, the user may manually enter information, which can be frustrating, is prone to errors, and may degrade the user experience.

To address these problems, the visual indicators may specify an image 'frame' using one or more corner markers 210. When the document is outside of the frame, the color of the relevant corner markers 210 may be changed. For example, in user interface 200 corner markers 210-1 and 210-2 may be colored red, while corner markers 210-3 and 210-4 may be green. This may intuitive alert the user that the document is outside the frame on the side specified by corner markers 210-1 and 210-2. When the document is within the frame specified by corner markers 210, all corner markers 210 may be colored green.

Similarly, visual indicator 212 may intuitively and graphically alert the user that the lighting conditions are suboptimal (such as when there is not enough light). Thus, visual indicator 212 may include a graphical symbol when there is not enough light (such as a 'sun' or a 'light bulb' showing a need for more illumination or light). This graphical symbol may be colored red. In response, the user may: turn on a light, move the document to a location with more light and/or activate a flash mechanism in the electronic device.

In some embodiments, when there is insufficient light, the imaging application may activate the flash mechanism without requiring user action.

Figure 3:
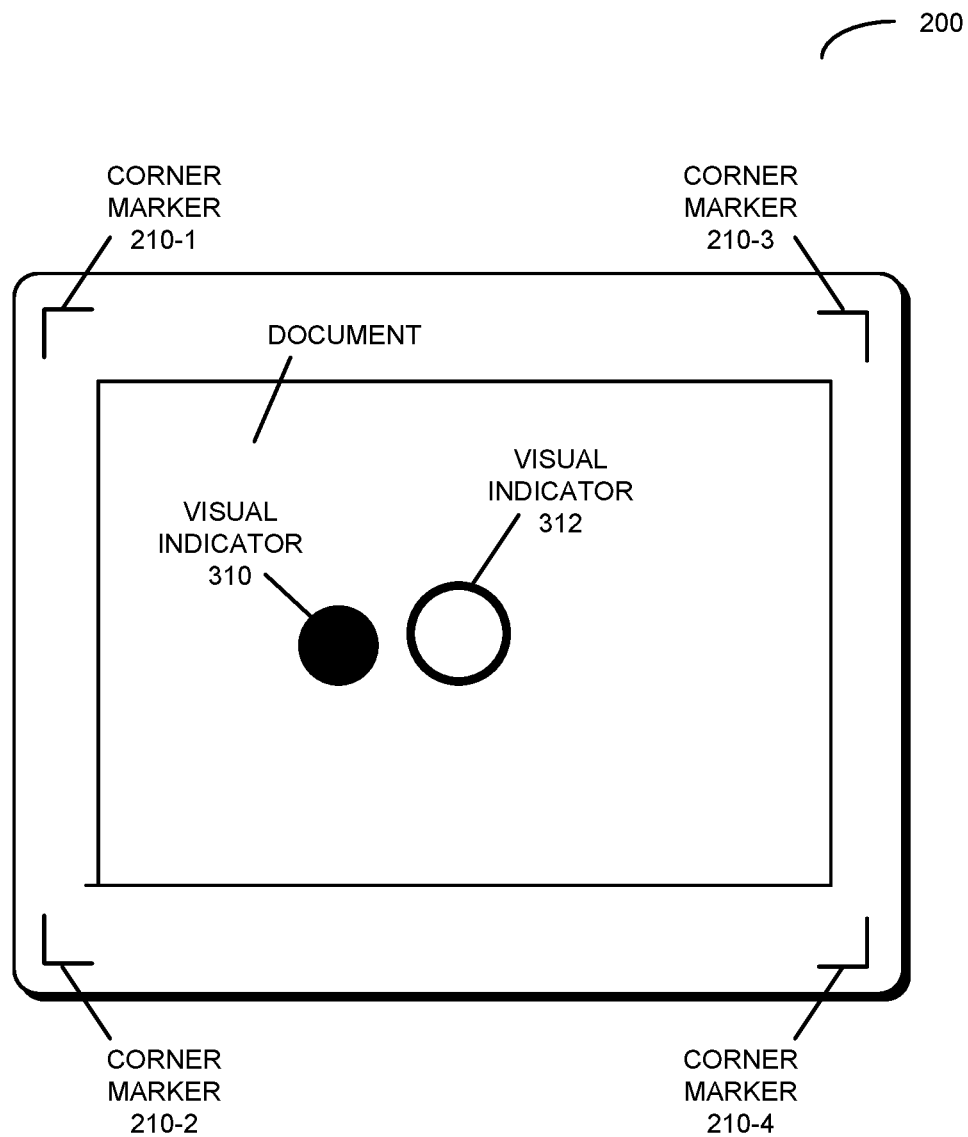
FIG. 3 is a drawing illustrating the user interface of FIG. 2 in accordance with an embodiment of the present disclosure.

As shown in FIG. 3, which presents a drawing illustrating user interface 200 (FIG. 2), visual indicators 310 and 312 may be used to intuitively alert the user about the tilt orientation of the electronic device relative to the document. In particular, visual indicators 310 and 312 may be a level indicator (like a carpenter's level tool). When visual indicator 310 (a ball) is outside of visual indicator 312 (a circle), the tilt orientation may be unacceptable. In this case, visual indicators 310 and 312 may be colored red. However, when visual indicator 310 (a ball) is inside of visual indicator 312 (a circle), the tilt orientation may be acceptable, and visual indicators 310 and 312 may be colored green.

In some embodiments, after an image is acquired, a retake or approval button may be displayed in the center of user interface 200 to request user feedback about the image. Additionally, user interface 200 may display a percentage (such as 25%) in the center of user interface 200 to indicate a percentage completion during subsequent extraction of information from an image using optical character recognition.

User interface 200 may make the process of obtaining suitable conditions (such as a suitable tilt orientation) a game for the user. Moreover, in these ways user interface 200 may assist the user in acquiring high-quality images that are suitable for subsequent extraction of information using optical character recognition.

We now describe embodiments of the electronic device. FIG. 4 presents a block diagram illustrating an electronic device 400. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as one or more program modules 422 or operating system 424), which may be executed by processing subsystem 410. For example, the one or more program modules 422 may include: a financial application (such as financial planning software capable of processing financial information, payroll software and/or accounting software), an image-acquisition (or imaging) application, and/or an extraction application. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420. For example, networking subsystem 414 can include a Bluetooth™ networking system, a cellular networking system (e.g., an 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each networking system are sometimes collectively referred to as a 'network interface' for the network system. Moreover, in some embodiments a 'network' between the electronic devices does not yet exist. Therefore, electronic device 400 may use the mechanisms in networking subsystem 414 to perform simple wireless communication between the electronic devices, e.g., transmitting advertising or beacon frames and/or scanning for advertising frames transmitted by other electronic devices.

Within electronic device 400, processing subsystem 410, memory subsystem 412, and networking subsystem 414 are coupled using bus 432. Bus 432 may include an electrical, optical, and/or electro-optical connection that the subsystems can use to communicate commands and data among one another. Although only one bus 432 is shown for clarity, different embodiments can include a different number or configuration of electrical, optical, and/or electro-optical connections between the subsystems.

In some embodiments, electronic device 400 includes a display subsystem 426 for displaying information on a display, which may include a display driver and the display, such as a liquid-crystal display, a multi-touch touchscreen, etc.

During method 100 (FIG. 1), the financial application (and, more generally, an arbitrary application) may be launched and executed by processing subsystem 410 based on a user command. For example, the user may launch the financial application by clicking on a physical button in a keyboard or a virtual icon associated with the financial application that is displayed on display subsystem 426.

Then, the financial application provides information (such as an instruction) to the user to point an imaging device in imaging subsystem 428, which is integrated into electronic device 400, to a location on a document. For example, the financial application may present the information on display subsystem 426.

As the user moves electronic device 400 in response to the displayed information, the image-acquisition application (which is also executed by processing subsystem 410) may display one or more visual suitability indicators on display subsystem 426. These visual suitability indicators may be based on one or more outputs from sensor subsystem 430, e.g., an accelerometer and/or a gyroscope integrated in electronic device 400. When the image is ready to be acquired (such as when the tilt orientation is within the predefined range), the image-acquisition application may communicate a signal to the imaging device to acquire one or more images. Note that these images may be acquired without explicit action by the user, such as without the user activating an image-activation mechanism associated with the imaging device. Then, the image-acquisition application may store the one or more images in memory subsystem 412.

In addition, the extraction application may analyze the one or more images to extract information proximate to the location on the document. For example, the information may be extracted using optical character recognition.

In some embodiments, the analysis of the one or more images is based on historical information previously extracted from one or more other documents (such as values from previous years). For example, if similar information has been previously extracted from another instance of the document, then this previously extracted information can be used during the analysis.

Additionally, the extracted information may be subsequently used by the financial application. For example, the financial application may use the extracted information to perform a financial calculation and/or to complete a financial form (such as an income-tax return).

Electronic device 400 can be (or can be included in) any electronic device with at least one network interface. For example, electronic device 400 can be (or can be included in): a personal or desktop computer, a laptop computer, a tablet computer, a mainframe computer, a portable electronic device (such as a cellular telephone or PDA), a server, and/or a client computer (in a client-server architecture). Although specific components are used to describe electronic device 400, in alternative embodiments, different components and/or subsystems may be present in electronic device 400. For example, electronic device 400 may include one or more additional processing subsystems 410, memory subsystems 412, networking subsystems 414, and/or display subsystems 426. Additionally, the one or more program modules 422 may include an encryption program module. In some embodiments, one or more of the subsystems is not be present in electronic device 400. Moreover, in some embodiments, electronic device 400 may include one or more additional subsystems that are not shown in FIG. 4. Also, although separate subsystems are shown in FIG. 4, in some embodiments, some or all of a given subsystem or component can be integrated into one or more of the other subsystems or component(s) in electronic device 400. For example, in some embodiments one or more of the one or more program modules 422 may be included in operating system 424 and/or the imaging application may be included in the financial application.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

While the imaging application was used as an illustrative example of an implementation of the information-extraction technique, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for extracting textual information from a document, comprising:
    launching an imaging application that executes on the electronic device;
    displaying, in a window associated with the imaging application, visual suitability indicators of a tilt orientation of the electronic device relative to a plane of the document, wherein the visual suitability indicators include a ball whose position in the window indicates the tilt orientation, and a circular shape in the center of the window;
    modifying the visual suitability indicators when the tilt orientation falls within a predefined range, wherein modifying the visual suitability indicators includes displaying the ball within the circular shape in the center of the window;
    acquiring an image of the document using an imaging device, which is integrated into the electronic device; and
    extracting the textual information from the image of the document using optical character recognition.

2. The method of claim 1, wherein the method further comprises receiving a user command to extract the textual information; and
    wherein the imaging application is launched in response to the user command.

3. The method of claim 1, wherein the visual suitability indicators are non-textual.

4. The method of claim 1, wherein the visual suitability indicators include: corner markers proximate to the corners of the window.

5. The method of claim 1, wherein modifying the visual suitability indicators includes changing color of a visual suitability indicator.

6. The method of claim 1, wherein the image is acquired without the user activating an acquisition icon associated with the imaging device.

7. The method of claim 1, wherein the image is acquired after the tilt orientation falls within the predefined range for more than a time interval.

8. The method of claim 1, wherein, after acquiring the image, the method further comprises:
    displaying the image to a user;
    receiving user feedback about the image from a user; and
    if the user feedback rejects the image, repeating the displaying, modifying and acquiring operations to acquire another image of the document.

9. The method of claim 1, wherein, after extracting the textual information, the method further comprises receiving user feedback from a user about the accuracy of the extracted textual information.

10. The method of claim 1, wherein the visual suitability indicators further indicate at least one of: light intensity, an in-plane orientation of the document relative to the electronic device, and framing of the document in the window; and
    wherein the visual suitability indicators are further modified when at least one of: the light intensity is sufficient, the in-plane orientation falls within a second predefined range, and the document is suitably framed in the window.

11. A computer-program product for use in conjunction with an electronic device, the computer-program product comprising a non-transitory computer-readable storage medium and a computer-program mechanism embedded therein, to extract textual information from a document, the computer-program mechanism including:
    instructions for launching an imaging application that executes on the electronic device;
    instructions for displaying, in a window associated with the imaging application, visual suitability indicators of a tilt orientation of the electronic device relative to a plane of the document, wherein the visual suitability indicators include a ball whose position in the window indicates the tilt orientation, and a circular shape in the center of the window;
    instructions for modifying the visual suitability indicators when the tilt orientation falls within a predefined range, wherein modifying the visual suitability indicators includes displaying the ball within the circular shape in the center of the window;
    instructions for acquiring an image of the document using an imaging device, which is integrated into the electronic device; and
    instructions for extracting the textual information from the image of the document using optical character recognition.

12. The computer-program product of claim 11, wherein the visual suitability indicators are non-textual.

13. The computer-program product of claim 11, wherein the visual suitability indicators include: corner markers proximate to the corners of the window.

14. The computer-program product of claim 11, wherein the visual suitability indicators further indicate at least one of: light intensity, an in-plane orientation of the document relative to the electronic device, and framing of the document in the window; and
    wherein the visual suitability indicators are further modified when at least one of: the light intensity is sufficient, the in-plane orientation falls within a second predefined range, and the document is suitably framed in the window.

15. An electronic device, comprising:
a processor;
memory; and
a program module, wherein the program module is stored in the memory and configurable to be executed by the processor to extract textual information from a document, the program module including:
  instructions for launching an imaging application that executes on the electronic device;
  instructions for displaying, in a window associated with the imaging application, visual suitability indicators of a tilt orientation of the electronic device relative to a plane of the document, wherein the visual suitability indicators include a ball whose position in the window indicates the tilt orientation, and a circular shape in the center of the window;
  instructions for modifying the visual suitability indicators when the tilt orientation falls within a predefined range, wherein modifying the visual suitability indicators includes displaying the ball within the circular shape in the center of the window;
  instructions for acquiring an image of the document using an imaging device, which is integrated into the electronic device; and
  instructions for extracting the textual information from the image of the document using optical character recognition.

16. The electronic device of claim 15, wherein the visual suitability indicators include: corner markers proximate to the corners of the window.

17. The electronic device of claim 15, wherein the visual suitability indicators further indicate at least one of: light intensity, an in-plane orientation of the document relative to the electronic device, and framing of the document in the window; and
  wherein the visual suitability indicators are further modified when at least one of: the light intensity is sufficient, the in-plane orientation falls within a second predefined range, and the document is suitably framed in the window.

* * * * *